March 3, 1936.  F. B. O'SHEA  2,032,850
DIRECTION SIGNAL FOR AUTOMOBILES
Filed July 16, 1934   2 Sheets-Sheet 1

INVENTOR
Francis B. O'Shea
BY Martin & Rendell
ATTORNEYS

March 3, 1936.　　F. B. O'SHEA　　2,032,850
DIRECTION SIGNAL FOR AUTOMOBILES
Filed July 16, 1934　　2 Sheets-Sheet 2
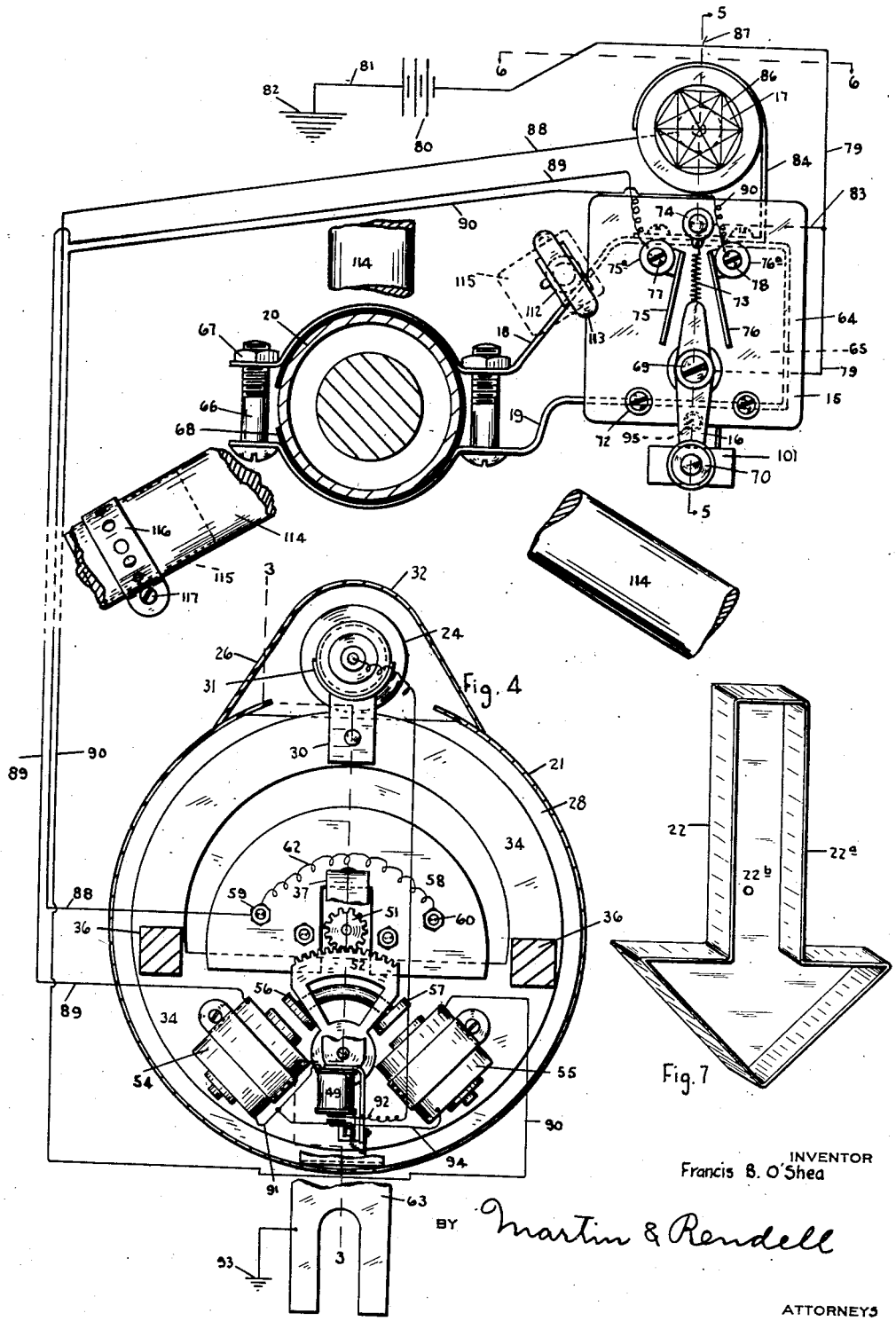
INVENTOR
Francis B. O'Shea
BY Martin & Rendell
ATTORNEYS Patented Mar. 3, 1936

2,032,850

UNITED STATES PATENT OFFICE 2,032,850

DIRECTION SIGNAL FOR AUTOMOBILES

Francis B. O'Shea, Ilion, N. Y., assignor of one-half to Byron T. Denison, Ilion, N. Y.

Application July 16, 1934, Serial No. 735,334

9 Claims. (Cl. 177—327)

This invention relates to vehicle signal devices and particularly to a direction signal device for automobiles.

The purposes of my present invention are to provide a direction indicating signal device for automobiles which is of new and improved construction and operation and which is simple and economical in construction and durable and reliable in operation; which has new and improved means and relation of its parts so as to more plainly and definitely make the movable direction indicator stand sharply revealed against a contrasting background in its different positions and under different conditions and which has its movable indicator so shaped that its front or face which is towards an observer is completely shaded from the signal light which illuminates the background about the indicator; which has new and improved mechanism consisting of a switch and attached parts located upon the steering column, preferably below the steering wheel whereby the driver of the automobile may move the switch to indicate that he is going to make a right or a left hand turn and to have said switch locked in the direction to which the driver turned it so that it leaves the driver's hands free for other things and yet is provided with means for either manually releasing said lock or automatically releasing the locking mechanism by the turning of the steering wheel incident to making the turn which has been forecast by the driver and which device further has improved means and cooperation of parts between the switch and its attachments on the steering wheel and column and the signal lamp and movable indicator usually mounted at the rear of the automobile whereby the movable indicator which is normally in locked neutral position will be first unlocked and rendered free to easily move and then moved to the desired position and the lamp indicating the position of the movable indicator will be lighted and also a pilot light adjacent the operating switch on the steering column will be lighted to indicate to the driver that the movable indicator has been moved to desired position and that the light adjacent the indicator is burning.

Further purposes and advantages of this invention will appear from the specifications and claims herein.

Fig. 4 is a diagrammatic view of the entire system and its electrical connections including a plan view of the switch and its adjacent parts attached to the steering post just below the steering wheel of the automobile and including in the lower part of said view an elevation as on line 4—4 of Fig. 3 of the mechanism in the inner compartment of the signal casing having the movable indicator.

Fig. 7 is a cabinet projection of the indicator which is movably mounted in the signal casing.

Figure 6:
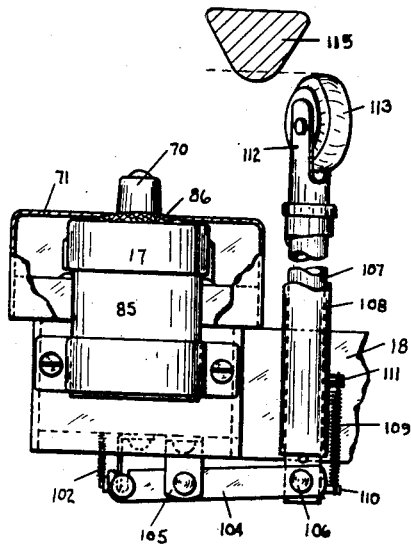
Fig. 6 is a top edge view of the switch and its attached parts as would be seen from line 6—6 of Fig. 4 but showing the cam on the steering wheel spoke moved close to the roller at the top of the release rod.

Referring to the drawings in a more particular description it will be seen that the direction signal device for automobiles of which the whole system is shown in Fig. 4 includes a switch generally denoted by the numeral 15 with closely adjacent means for manually releasing the switch arm 16 and other closely adjacent means for automatically releasing said switch arm and a pilot light 17 preferably close to said switch, all of these parts being mounted by means of bracket arms 18 and 19 upon the steering wheel post 20 of the automobile, together with a signal casing 21 ordinarily mounted at the rear or side of an automobile (but sometimes also at its front) and carrying the movable indicator 22 ordinarily preferably in the form of an arrow, which is housed in the outer chamber 23 of the casing with the signal light 24 illuminating said outer chamber 23, said signal light and said indicator being lighted and controlled by operating means in the inner chamber 25 of said signal casing which operating means in turn are controlled by the said electric switch on the steering post of the automobile.

The signal device proper consists of the open-ended box-like casing 21 and its contained parts. The casing is conveniently of cylindrical form but with a bulge or enlargement 26 at the top for the signal light 24 and its red window 27. The said casing is divided by a vertical partition 28 into the inner chamber 25 and the outer chamber 23 at the open end of the casing. As one looks at this casing from the rear of the car where this signal casing is usually mounted there will be seen the window 29 of transparent glass or other suitable material closing the open end of the outer chamber 23 and spaced from the opposite or dial face 28ᵃ of the said partition 28 and enclosing and protecting the indicator 22 which is movably mounted in the said outer chamber. The signal lamp 24 is protected by its window 27 commonly red in color. The partition 28 is circular in shape and to its inner face away from its dial face 28ᵃ is fastened a thicker and stronger plate 34 of conductive material from which extends upwardly and then farther into the inner chamber 25 an arm 30 to have strongly secured thereto the socket 31 of the signal lamp 24 which is mounted in the upward or bulging portion 26 of the casing. The bulb 32 of the said signal lamp projects into the outer chamber 23 of the casing and has its lighting elements such as its electric filament 33 in a plane between the dial face 28ᵃ of the partition 28 and the free edge of the flange on the indicator. This dial face 28ᵃ of the partition 28 is coated with light-reflecting material such as white paint or the like so as to be brightly illuminated by the signal lamp 24. The curved inner side walls of this outer compartment are of light-reflecting material or finish as by being of polished metal and so adapted to reflect light from the signal lamp upon the dial face 28ᵃ of said partition.

The partition 28 and the said attached plate 34 of conductive material are secured in the proper position in the casing 21 as by means of a pair of screws 35 going through said partition and plate into a pair of posts 36 projecting from the end 21ᵃ of the casing 21 towards and to said plate.

In the inner chamber 25 there is provided a U-shaped frame 37 secured in place by one arm thereof being attached to the free surface of the plate 34. The top of this frame is slightly above the general axial longitudinal center of the inner chamber 25 and at said axial center there is mounted in two bearings in said U-shaped frame the shaft 38 with one end of said shaft projecting through said plate 34 and the partition 28 a short distance out into the outer chamber 23 upon which projecting end of the shaft there is fixed the indicator 22. It will thus be seen that the indicator 22 can be rotated to the desired extent and will at all times and in all positions be visible through the window 29. In practice the extent of rotation is a quarter of a rotation in either direction from a neutral position.

Figure 2:
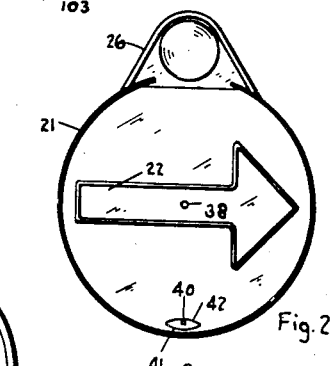
Fig. 2 is a view of the parts shown in Fig. 1 with the window removed and with the movable indicator turned to one horizontal position.
Figure 1:
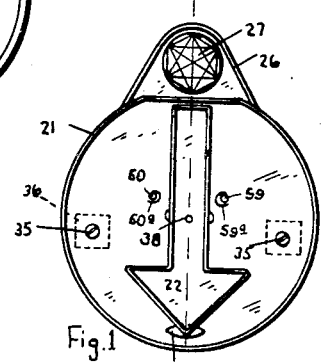
Fig. 1 is a front or face view of the direction signal itself looking at the movable indicator and the window of the casing.

The indicator may be of any desired shape but normally and preferably will be of the conventional arrow shape as shown in Figs. 1 and 2. The indicator 22 about its periphery is provided with a flange 22ᵃ projecting towards the window 29 as will be seen particularly in Figs. 3 and 7. The purpose of this flange 22ᵃ is to keep the face 22ᵇ of the indicator 22 that is towards the window 29 and so towards any observer, in the shadow relative to the light from the filament 33 of the signal lamp 24. By referring to Fig. 3 it will be seen that the filament 33 of said lamp is towards the window 29 relative to the dial face 28ᵃ of the partition 28 as already mentioned, but that the filament 33 is in a plane farther from the window 29 than is the free edge of the flange 22ᵃ upon the indicator. It will thus be seen that the said lamp illuminates either directly or by reflected light the dial face 28ᵃ but that neither the direct rays of light from the filament 33 can get past the flange 22ᵃ to the face 22ᵇ of the indicator nor can light reflected from the side walls of this outer chamber get past said flange to the face 22ᵇ of the indicator. Obviously also no light reflected from the dial face 28ᵃ can reach the other side of the indicator, that is the observed face 22ᵇ. It will thus be seen that when the indicator 22 is moved to have its point turned either to the right or to the left to indicate that a turn is to be made in those respective directions and the signal light 24 is lighted, the said indicator or arrow will itself appear as a darkly shadowed arrow sharply defined against the brilliantly illuminated dial face 28ᵃ. By experience I have found that this contrast of a dark or shaded arrow standing out against a white and brightly illuminated background produces an indicator that is very sharply defined and that is more readily noticed and more easily seen at a long distance and has greater visibility than any of the contrasting colors or combinations of colors and structures heretofore used. It is evident that there will be this distinct visibility when this signal device is used at night or in the poor light of morning or evening. It will be understood that at all times the signal lamp 24 is illuminated whenever the signal indicator is turned from its neutral down position to either its left hand or right hand pointing direction.

To meet the condition of strong outside light coming through the window of the signal casing the face 22ᵇ of the indicator 22 will preferably be painted or otherwise colored sharply contrasting with the white of the dial face 28ᵃ such as by having the face 22ᵇ colored a direct color as red or a dense black. It will now be seen that when an automobile equipped with this signal device at its rear is approached from behind by another automobile having its head-lights lighted the strong light from the said head-lights will bring out the color upon the face 22ᵇ of the said movable indicator in even stronger contrast to the now evenly more strongly illuminated white face of the dial 28ᵃ. Under these circumstances the arrow indicator 22 will appear pointing downwardly in the neutral position. If then the driver of the car having this device brings it into operation and moves the arrow indicator, say to indicate a left-hand turn and so causes the arrow to be turned to point to the left the change of position will be distinctly noticeable to the driver of the following automobile. Similarly on a bright day there may be under some circumstances light enough entering the window 29 to show the color and particularly the outline of the arrow even when it is in neutral position and not illuminated by its own signal light. If then the driver of the automobile equipped with this device moves his switch to cause a movement of the arrow indicator that movement will be noticeable to the driver of a car following closely at hand and the illumination of the dial background of the arrow by the signal lamp 24 will show the contrast between the arrow and its background even more sharply notwithstanding the daylight illumination of the arrow and dial. It will thus be seen that in all combinations of either night driving or day driving and whether the following automobile has its headlights lighted or not this flanged and so shaded outline of the movable indicator will produce a more sharply defined and more reliable visibility of the indicator than has been obtained heretofore.

Normally the indicator 22 is locked in its neutral or downward position as shown in Fig. 1 by an ear 39 on the back side of the indicator close to the point end thereof, being held between the sides of a notch 40 of a movable cam plate 41. This cam plate has two cams 42 one on each side of the notch 40. This cam plate 41 is yieldingly supported in position to have the notch 40 engage the ear 39. The said cam plate 41 is located mostly below the ear 39 in the outer chamber 23 and is yieldingly mounted as by being upon one end of a lever 43 which is mounted intermediate its ends as on a pin 44 upon a bracket 45 suitably provided in the inner chamber 25 as by being fastened to the frame plate 34 adjacent the partition 28. The said lever 43 has attached thereto a spring to yieldingly hold the cam plate 41 upwardly against the arrow ear 39 as by said lever beyond its pivoting point 44 having attached thereto one end of a small tension spring 46 the other end of which is farther down in the said chamber and fastened to a suitable anchor as 47 projecting downward from the lever-supporting bracket 45. It will now be seen that when the arrow indicator 22 is released from either horizontal position its pointed end being the heavier end of the arrow will tend to return to normal or downward pointing position and towards the end of its said downward travel the said ear 39 will come into engagement with one cam 42 of the cam plate 41 and will cam said plate downwardly against the tension of the spring 46 until the ear 39 is directly over the notch 40 in said plate. Then the spring 46 will raise said cam plate so that the other side of the notch will engage said arrow and prevent the arrow from swinging past the notch. The arrow indicator will then be held securely in vertical position against any tendency to swing to either side caused by road vibration or the travel of the automobile.

The end of said lever 43 away from the cam plate is provided with an armature 48 adapted to cooperate with an electro-magnet 49 placed above the said armature and in the inner compartment 25 of the casing. This armature may be conveniently supported by an angle-shaped frame member 50 extending from the bottom of the partition 28 horizontally below said lever 43 to a point just beyond the said armature and then upward to be attached to the upper part of the U-shaped frame 37. It will be seen that energizing the electromagnet 49 by suitable electric current by connections hereinafter explained will operate to raise the armature 48 and thus depress and hold depressed the cam plate 41 so as to release the ear 39 from the notch of the cam plate. This energizing of the electromagnet is done to render the movable indicator 22 perfectly free to be moved by the swinging of its shaft 38. Such movement of the arrow indicator 22 is produced by means of the pinion 51 rigidly secured upon the indicator shaft 38 being partly rotated by the swinging of a segmental toothed rack 52 projecting from the rack shaft 53. The opposite ends of said rack shaft 53 are mounted in suitable bearings in the lower ends of the arms of the U-shaped frame 37 already mentioned. Movement or partial rotation of said toothed rack is brought about by the energizing of either of the oppositely placed electro-magnets 54 or 55 located on opposite sides of the rack shaft 53 and adapted to respectively attract when energized the oppositely placed armatures 56 and 57 secured at the opposite sides of said toothed rack as will be best seen by an examination of these parts as seen in Fig. 4.

Figure 3:
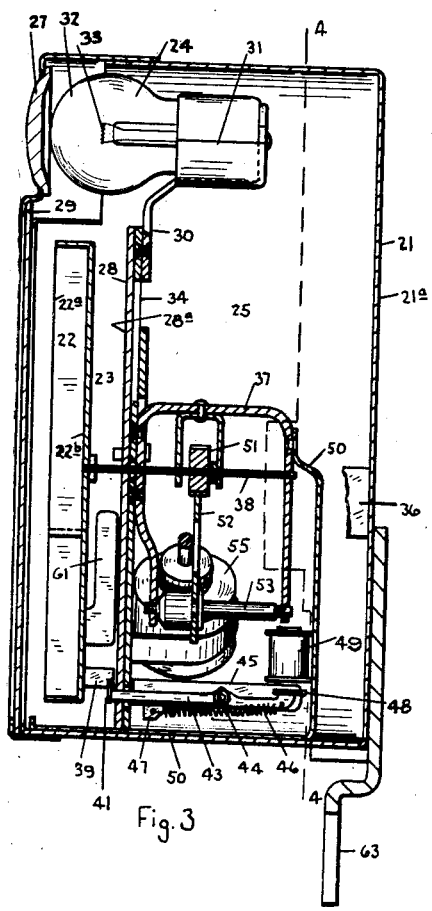
Fig. 3 is a vertical sectional view on line 3—3 of Fig. 1 but on an enlarged scale.

Secured close to the partition 28 and the frame plate 34 is an arch-shaped plate 58 formed of insulating material. Secured to this plate and projecting therefrom through the frame plate 34 and the partition 28 are two contact posts 59 and 60 on the opposite sides of the indicator shaft 38 and preferably slightly above the level of said indicator shaft. The ends of these posts that project beyond the dial face 28ª into the outer compartment are preferably provided with curved spring contact arms 59ª and 60ª respectively. Between the ear 39 and the shaft 38 the back of the arrow indicator 22 is provided with an electric conducting and preferably slightly resilient contact arm 61. Sufficient resiliency of this arm may be obtained by having the arm fastened to said arrow relatively close to the ear 39 and then project towards the shaft 38 with a considerable length free of said arrow as shown in Fig. 3. When the arrow indicator has been released from its locking cam plate 41 through the operation of electromagnet 49 and then swung to substantially horizontal position in either direction according to which electromagnet 54 or 55 has been energized the post 59 or 60 or the curved spring contact 59ª or 60ª respectively of those posts will be engaged by one side or the other of the arm 61 and thus establish an electrical connection between the arrow indicator and the post 59 or the post 60. Within the inner chamber 25 the contact posts 59 and 60 are electrically connected by a short connecting wire 62. It will be understood that not only is the contact arm 61 of the indicator 22 of conductive material but also sufficient of the indicator itself as to carry electric current from said arm 61 to the indicator shaft 38 and this shaft through its various bearings in the U-shaped frame 37 is in electrical contact with the frame 34 which in turn is in electrical contact with the partition 28 and the casing 21 which casing in turn is in electrical connection with or grounded upon the frame or chassis of the automobile by means of the forked bracket 63 by means of which the casing is secured to the bumper or other suitable supporting part of the automobile.

It will be noted also that the outer terminal of the signal lamp 26 through being mounted in the socket 31 on arm 30 is in electrical connection with the frame plate 34 which as already mentioned is grounded upon the frame work of the car by means of the said supporting bracket 63.

*Operating switch and adjacent parts*

A plan view of the operating switch and its attached parts is shown in the upper part of Fig. 4. The switch has a base 64 conveniently formed of wood and secured thereto is a sub-base 65 also of wood but of considerably smaller size. A strip of metal is bent to encircle three sides of the sub-base 65 and be suitably fastened to the sub-base with the opposite ends of the strip of metal extended in an angular direction as appears in Fig. 4 and spaced apart as bracket arms 18 and 19 already mentioned with the end length of each arm curved outwardly in opposite directions so as to form a convenient clamp adapted to be readily adjusted upon and securely attached to the steering post or column 20 of the automobile by means of two bolts 66 and nuts 67. Between the curved parts of these bracket arms and the metal post itself there will preferably be inserted a bent layer of insulating material 68.

The switch arm 16 which is of conductive material is mounted intermediate of its ends upon a suitable pivot 69 of conductive material. The lower or near end of the arm as seen in Fig. 4 projects beyond the adjacent edge of the switch base and is there provided with an upstanding handle 70 preferably having its outer layer of insulating material. A strong flanged cap 71 covers the switch and its attached parts upon the switch base with the flange of the cap set down about the edges of the switch base 64 and detachably secured thereto. This cap protects the parts of the switch from injury or contact. Said cap is removed from the switch in the drawings shown in Fig. 4 but is indicated as being in place in Figs. 5 and 6. The lower end of the switch arm projects out through the flange of the cap with the handle 70 outside the cap as appears in Fig. 5 in convenient position to be operated by the driver of the automobile.

Opposite the lower half of the switch arm 16 the switch base 64 is provided with two stops 72 on the opposite sides of the switch arm and so placed as to stop the swinging motion of the switch arm when it has been moved the proper distance in either direction. The switch arm at its end away from its handle 70 has attached thereto a small tension spring 73 the other end of which is fastened to a post 74 near the top edge of the switch base. Upon the switch base 64 upon opposite sides of the straight or neutral position of the upper part of the switch arm 16 there are provided electrical contact arms 75 and 76 at the left and right respectively as the parts are seen in Fig. 4 with said contact arms so placed that movement of the handle towards the right hand will bring the upper end of the switch arm against the left hand contact arm 75 and the swinging movement of the handle 70 to the left will in a similar way bring the upper end of the switch arm into contact with the right hand contact arm 76. The contact arms 75 and 76 are preferably formed with a slight yield or spring as by projecting clear of the switch base some distance from their respective angularly disposed ends 75a and 76a which are secured in any desired manner as by screws 77 and 78 to the switch base. The switch pivot 69 is electrically connected as by a wire 79 to a battery 80 commonly the lighting and service battery of the automobile and the farther terminal of this battery is grounded as by a wire 81 attached to the frame of the automobile at any suitable spot as indicated symbolically by the ground 82. I prefer to also connect the post 74 which is attached to one end of the tension spring 73 to the wire 79 as by a wire 83. This connection in a way is surplusage as the switch arm 16 is always in good electrical contact with the pivot 69 and ordinarily reliance cannot be placed upon a connection through the tension spring 73.

A suitable bracket arm 84 projects from the sub-base of the switch to support just above the upper end of the switch base 64 the socket 85 of the pilot light 17. The light from this bulb is suitably screened as by a colored window 86. The inner terminal of the lamp is connected as by a wire 87 to the wire 79 already mentioned as extending to the battery 80. The outer terminal of this pilot light is connected to a wire 88 which is one of the three wires that are carried from the switch and its closely adjacent parts back through the automobile or about the automobile to be connected to its proper part in the casing 21 mounted upon the rear of the automobile. As this system is arranged this pilot light lead wire 88 is connected to the contact post 59 already described as being engaged by the contact arm 61 of the movable indicator 22 when the indicator is swung to the full extent in one direction. When the indicator is swung in the other direction it will similarly engage the projecting contact post 60 (specifically its curved spring contact arm 60a) and thus through connecting wire 62 be connected to the said wire 88 leading from the outer contact of said pilot light.

When the driver wishes to give warning that he is about to make a turn to the right he swings the projecting lower end of the switch arm 16 to the right which moves the other end of said switch arm into close contact with the contact arm 75. The fixed end 75a of this arms has attached thereto one end of the wire 89 which is the second wire leading from the switch back to the signal casing mentioned as secured to the rear end of the automobile. As the working parts both electrically and mechanically are shown and described herein this lead wire 89 goes to one end of the electromagnet 54 which is the electromagnet that will attract the armature 56 and swing the indicator 22 to the right as the signal casing 21 is viewed by a driver or other person at the rear of the automobile equipped with this device. It will be noted that the view of the operating mechanism within the casing and shown in the lower half of the view Fig. 4 is taken on line 4—4 of Fig. 3 and looking to the left in Fig. 3, that is towards the said mechanism from the closed end 21a of the casing or looking towards the free side of the frame plate 34. In other words this operating mechanism is viewed from within the casing looking rearwardly of the car and so is reversed compared to the Figs. 1 and 2 which show the outside of the signal casing as one looks at the said signal casing from behind the automobile. It follows from this that as these operating parts were seen in Fig. 4 the energizing of magnet 54 moves armature 56 and therewith the rack 52 to the left and thereby moves the pinion 51 in a clockwise direction which swings the indicator point from its downward neutral position to a horizontal position pointing to the left as seen in Fig. 4 but which when one looks at the indicator directly from behind the rear signal lamp would show the indicator pointing to the right as in Fig. 2.

In a similar manner the swinging of the projecting or handle end of the switch arm 16 towards the left is made when the driver of the automobile wishes to indicate he is about to make a left hand turn. This swinging to the left of the projecting end of the switch arm will bring the other end of the switch arm into good electrical contact with the contact arm 76 at the right hand side of the switch base 64. This contact arm through its base end 76a is connected to lead wire 90 which is the third and last of the wires to be carried from the switch back through or around the automobile to the proper part within the signal casing mounted at the rear of the automobile. As will be seen from Fig. 4 this lead wire 90 extends to one terminal of the other electromagnet 55 shown as at the right hand side of the mechanism as seen in the lower half of said view 4. This electromagnet when energized by the closing of the contact upon the switch attracts the adjacent armature 57 and causes a swinging to the right hand of the rack 52 and thereby causes a rotation of the pinion 51 in an anti-clockwise direction which swings the point end of the arrow indicator upward from neutral position to a point to the right, as this arrow would appear if visible in Fig. 4 but due to Fig. 4 being a view of the back of the operating means as already explained the arrow will actually then be pointing to the left when seen by a person looking at the window and face of the arrow from behind the automobile.

Each of the arrow indicator moving electromagnets 54 and 55 is electrically connected in series with the release electromagnet 59 and the main signal lamp 24 so that whichever way the operator of the automobile turns the switch arm 16 the electromagnet 49 will be energized to release the locking cam plate 41 from engagement with the ear 39 on the back of the movable indicator thus unlocking the indicator and allowing the indicator to swing to a point in the horizontal direction desired due to the energizing of one of the electromagnets 54 and 55 and at the same time lighting the main signal lamp 24. Suitable electrical connections for accomplishing these purposes are shown in the drawings and are as follows, namely, the other or outer end of electromagnet 54 is connected by a wire 91 to one terminal of the release electromagnet 49 while the other end of this magnet is connected by wire 92 to the inner terminal of the signal lamp 24. As already mentioned the outer terminal of this lamp is connected through its socket to arm 30 which is in mechanical and electrical contact with the general frame of the plate 34 which through its connection to the casing and the connection of the casing through forked bracket 63 is connected to and grounded upon the frame of the automobile as symbolized by ground 93. As at the other end of the circuit battery wire 81 is grounded as at 82 upon the frame of the automobile, it will be seen that the movement to the right of the handle end of the switch arm 16 with its consequent engagement of the inner end of the said switch arm with contact plate 75 will close this circuit and such closing will release the locking cam plate 62, move the indicator to a point to the right as seen from behind the automobile and will light the signal lamp 24.

The electric connections for the other electromagnet 55 are as follows: The other or outer end of this electromagnet is connected as by wire 94 to the wire 91 which as already mentioned leads to one terminal of the release magnet 49. The rest of this circuit has been already described as including the wire 92 leading from the other end of the release magnet 49 to the inner terminal of the lamp 24. It will accordingly be seen that movement of the handle 70 of the switch arm 16 to the left will bring the other end of the switch arm into contact with the right hand contact arm 76 and thus close this circuit extending through wire 90 to the electromagnet 55. The other portion of this circuit will of course be through the pivot 69 of the switch arm by means of wire 79 to the battery 80 and then through wire 81 to a ground 82 upon the frame of the automobile. Such ground will of course be electrically in contact with ground 93 indicated as the connection of the bracket 63 holding the signal casing 21 at the rear of the automobile. As already mentioned this bracket is in electrical connection with the casing 21, the partition 28 and frame plate 34.

Means are provided in connection with the switch for holding the switch arm 16 in either operating position to which it is moved. This relieves the operator of the automobile from having to keep his finger or thumb upon the switch handle after he has moved it to that position and insures that the indicator will be held in the desired horizontal position long enough to be seen by the driver of a following automobile. This locking of the switch arm 16 in either operating position is accomplished by providing a spring-pressed pin 95 in a sleeve 96 near the near edge of the switch base 64 and in substantially a vertical position at the center line of the switch arm when it is in neutral position. The spring tension upon this pin 95 is such as to tend to draw the pin upwardly so that as soon as the said switch arm is moved to either operative position the upper end of the pin moves upwardly from its contact with the lower side of the switch arm and engages the side of the switch arm nearest the said pin. The lower end of said pin 95 is directly or through a flattened extension thereof pivotally connected by pivot 97 to a lever 98 the middle portion of which lever is pivoted as at 99 to a bracket 100 projecting downwardly from the bottom of the sub-base 65. On the right hand end of the lever 98 as seen in the side elevation thereof shown in Fig. 5 the said lever is provided with an upstanding extension 98ª, to the upper end of which is secured a flat operating key 101 located a little ways below the handle 70. The upward spring tension of pin 95 is conveniently produced by a small tension spring 102 having its upper end secured to a suitable fastener upon the metal band going about the sub-base 65 and with the lower end of said spring hooked on to the pivot 97. The locking of the switch arm 16 in either of its operative positions effected by the sliding pin or bolt 95 may be manually released by the driver temporarily pressing downwardly upon the operating key 101. Such downward pressure draws the pin or bolt 95 downwardly and allows the switch arm 16 to swing back to central or neutral position under the tension of its spring 78. This return of the switch arm to its neutral position will of course break the connection between the switch arm and the contact plate 75 or 76 with which it was engaged and accordingly the circuit formerly completed through the switch arm and said contact plate and already described in detail will be broken. This will result in the de-magnetization of the release magnet 49 and of the indicator-moving magnet 54 or 55, whichever was used, and in the extinguishment of the signal lamp 24. The de-magnetization of the release magnet 49 will allow the cam plate 41 to move upward under the tension of its spring 46 thus rendering the cam plate ready to lock the indicator. The de-magnetization of the indicator-moving electromagnet either 54 or 55 will allow the indicator 22 to swing from horizontal position to have its arrow point directly downward thereby swinging the toothed rack back to neutral position. During the last part of the downward swinging movement of the point end of the indicator the indicator ear 39 will cam the cam plate 41 downwardly against its spring tension until the ear comes opposite the notch 40 as already heretofore explained. The switch and its adjacent mechanism are then in position to be operated the next time.

Figure 5:
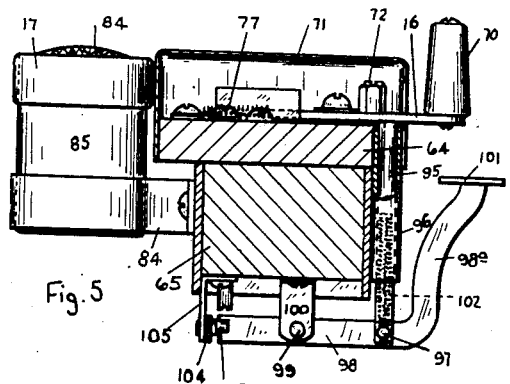
Fig. 5 is a sectional view of the switch and its adjacent parts on line 5—5 of Fig. 4.

The automatic release of the switch arm from its locking pin or bolt 95 in either operative position is accomplished by means which will now be described. The left hand end of the locking pin-moving lever 98 as seen in Fig. 5 is provided with a finger 103 extending beyond said lever and into an open-topped slot in a lever 104. This lever is pivoted intermediate its ends upon a bracket 105 provided, and extending down from the bottom of the sub-base 65. The sectional view Fig. 5 as to this bracket is on a line to the left of the central section line 5—5 on Fig. 4 from which this view is taken in order to better show the details of construction of these parts. The side elevation of this lever 104 and its bracket 105 appears in Fig 6. The right hand end of this lever 104 as seen in Fig. 6 is pivoted as at 106 to the lower end of a push rod 107 vertically mounted in a supporting sleeve 108. This push rod is normally but yieldingly held in upward position by means of a coil spring 109 the lower end of which is attached to an ear 110 on the lower end of the said push rod while the upper end of the spring is attached to a suitable fastener 111 part way up on the sleeve 108. The upper end of the push rod 107 is provided with two forked or spaced arms 112 between which is mounted the roller 113. The sleeve 108 for said push rod is fixed to the bracket arm 18 as appears in Figs. 4 and 6. The brackets 18 and 19 are fastened to the steering post 20 far enough down below the spokes of the steering wheel to have the top of the roller 113 slightly below the bottom of said spokes. Upon the steering wheel spoke 114 which is normally to the left and opposite the switch 15 and the roller 113 there is secured a two-faced cam 115 as by means of an adjustable and detachable band 116 encircling said spoke and said cam and conveniently held in place by a bolt 117. The cam 115 projects downwardly far enough and is so placed on the spoke 114 as to come into engagement with the roller 113 when the steering wheel is moved about half way around in either direction. In Fig. 6 this cam is shown in the relative position it occupies just before or after engaging the roller 113.

Assuming that the driver of the automobile equipped with this system has turned the switch arm 16 in either direction and that the switch arm is still locked in that operative position by the locking bolt 95, it will be obvious that when the driver turns the steering wheel to make the turn that he has forecast by giving the signal therefor the rotation of the steering wheel will be on almost any automobile more than half the rotation of the steering wheel when a turn approaching a right angle is to be made and so will bring the cam 115 into engagement with the roller 113 thus causing a depression of the push rod 107. The depression of this push rod will swing the right hand end of lever 104 as seen in Fig. 6 downwardly and thus push upwardly the other end of said lever 104 thereby carrying upwardly the pin or extension 103 on the adjacent end of the lever 98. As will be seen from Fig. 5 the upward movement of that end of lever 98 will draw down the locking bolt 95 which is pivoted to said lever 98 and thus effect a withdrawal of the locking bolt automatically; that is by the steering rotation of the steering wheel without the driver having to separately or purposely having to operate any part of the system. As the steering wheel is rotated back to normal position after making the turn, the cam 115 will again engage roller 113 and cause an operation of the connected parts which will be a surplus or idle operation since the locking bolt will then be in depressed or retracted position from the former actual operation of the cam. It will be seen also as appears in Fig. 6 that the pin 105 projecting from lever 98 engages a slot in arm 104 which is open at the top of the slot. Accordingly when the driver wishes to manually release the locking bolt 95 by pushing down upon the release key 104 the locking bolt and the lever 98 alone move and the pin 103 rides upwardly in the open slot of lever 104 without causing or requiring a concurrent movement of the lever 104 or its attached push rod 107.

Figure 9:
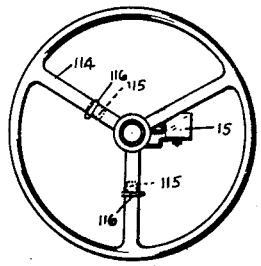
Fig. 9 is a plan view on a reduced scale showing my switch in connection with a steering wheel having two release cams.
Figure 8:
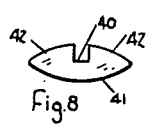
Fig. 8 is an elevation of cam plate 41.

Fig. 9 shows a modification where two release cams 115 are applied to two arms of the three of a steering wheel having less than the usual movement. One cam operates on right hand turns and the other on left hand turns even though the turns are much less than a right angle.

*Pilot light*

It will be noticed from the description already given that the pilot light 17 located just above the switch base 15 is not in either of the indicator-moving circuits which are completed by contact of the switch arm with either contact plate 75 or 76, but that the said pilot light is a part of a separate circuit. This separate circuit on the inner terminal side of said pilot lamp extends through wire 87 to wire 79 through battery 80 and wire 81 to ground 82 upon the frame. The outer terminal of this pilot lamp is connected through wire 88 to post 59 or 60 terminating respectively in the curved spring portions 59a and 60a respectively on the dial face of the casing. This circuit is completed only when through the complete operation of either of the other circuits the indicator 22 has been not only released from its locked position but swung its full extent to bring it into horizontal position where the indicator's contact arm 61 will engage either the spring contact 59a or 60a. When contact is made between the indicator arm 61 and either of the parts 59a or 60a the pilot light circuit will be completed back through the signal arm and its shaft to the frame plate 34 and thence to the casing and then to a ground upon the automobile frame adjacent the casing and so in electrical connection with the ground 82 beyond the battery 80. The purpose of this separate circuit and its being completed only when the indicator has moved to either of its operative or direction-signalling position is to let the driver know that the signal he has called into play has been fully completed. It will be seen that if anything is the trouble with either of the indicator-moving signal circuits so that the indicator 22 has not moved to its desired horizontal position, the pilot light 17 will not be lighted and the driver will thus be given a warning that the indicator is not working properly. As the indicator release magnet and the main signal lamp 24 and the indicator-moving magnets are in series in each of the main indicator-moving circuits, failure of either of those mechanisms will interrupt the moving of the indicator to horizontal position and thus prevent the lighting of the pilot light. On the other hand, as soon as the switch arm 16 is released from either of its operative positions, such release being either automatic or manual, the indicator 22 will move to downwardly pointing position and break the contact that was theretofore made against either of the parts 59a or 60a, thus extinguishing the pilot lamp. Such extinguishment of the pilot lamp indicates to the driver that the indicator 22 has moved from signalling position and that the main signal lamp 24 has been extinguished.

What I claim as new and desire to secure by Letters Patent is:

1. In a vehicle signal device, the combination of a casing having a front occupied in part only by a transparent window and having back of said front a chamber having light-reflecting back and side walls, an indicator mounted in said chamber and back of said window, said indicator being provided all about the periphery thereof with a flange extending forwardly towards the window and a lamp within said chamber and to one side of said indicator and back of the portion of the front not occupied by said window and having its lighting element rearward of the front edge of the indicator flange whereby the body of the indicator will appear in deep shadow sharply defined against the brightly illuminated back of the said chamber.

2. In a direction signal device for automobiles, the combination of a casing having a partition thereacross forming two chambers, the front one having a light-reflecting back and light-reflecting side walls and a front provided for only part of its area with a transparent window, an indicator rotatably mounted in said casing between the said partition and said window, said indicator being provided all about its periphery with a flange extending forwardly towards the window, a lamp within said casing outside the zone of travel of the indicator and having its lighting element forward of the partition and directly back of the part of the front not occupied by said transparent window and rearward of the front edge of said indicator flange whereby the body of the indicator will appear in deep shadow sharply defined against the brightly illuminated background of said partition and mechanism housed in the other chamber of the casing for moving said indicator.

3. In a direction signal device for automobiles, the combination of a casing having a partition thereacross forming two chambers, the front chamber having a light-reflecting back and light-reflecting side walls and a front occupied only in part by a transparent window, an indicator between the said partition and said window and mounted to rotate in a plane parallel to said window, said indicator being provided all about its periphery with a flange extending forwardly towards the window, a lighting element in said front chamber located to one side of the indicator and outside the zone of travel of the indicator and directly back of the part of the front not having the said transparent window and so positioned relative to the flange of the indicator that the face of the indicator will be unlighted and will appear in deep shadow sharply defined against the brightly illuminated background of said partition and mechanism housed in the other chamber of the casing for rotating the indicator and including a shaft having its end projecting into the lighted chamber and there connected to said indicator.

4. In a direction signal device for automobiles, the combination of a casing having a front occupied in part only by a transparent window and spaced opposite from the said front a light-reflecting dial, an indicator movably mounted in said casing between the dial and the window, said indicator being provided all about its periphery with a flange extending towards the window and a lamp in said casing outside the zone of travel of the indicator and having its lighting element back of the part of the front not occupied by the said window and not visible to an observer through said window and in a plane between the said dial and the free edge of the said flange whereby the body of the indicator will be shaded from the direct and reflected light from said lamp and its outline will be sharply defined against the lamp-illuminated dial and means operatively connected to said indicator for moving the same.

5. In a direction signal device for automobiles, the combination of a casing having a front occupied in part only by a transparent window and spaced opposite from the said front a light-reflecting dial, the inner surface of the said walls of said casing being also of light-reflecting character, an indicator movably mounted in said casing between the dial and the window, said indicator being provided all about its periphery with a flange extending towards the window and a lamp in said casing outside the zone of travel of the indicator and having its lighting element back of the part of the front not occupied by said transparent window and not visible to an observer through said window and in a plane between the said dial and the free edge of the said flange whereby the body of the indicator will be shaded from the direct and reflected light from said lamp and its outline will be sharply defined against the lamp-illuminated dial and means operatively connected to said indicator for moving the same.

6. In a turn-indicating signal device for vehicles, the combination of a casing having a chamber with light-reflecting back and side walls and a front having a transparent window and a screened portion to one side of the said window, an indicator mounted in said chamber, directly back of said window, a lighting element in said chamber, located laterally of said indicator and back of said screened portion of the front of the chamber and not visible to an observer through the said window and a flange extending about the periphery of the indicator and projecting towards the window far enough to shade the front face of the indicator from the direct and reflected rays of the lighting element, whereby the body of the indicator as seen through the window will appear in deep shadow sharply defined against the brightly illuminated back of said chamber.

7. In a turn-indicating signal device for vehicles, the combination of a casing having a chamber with light-reflecting back and side walls and a front having a clear transparent window and a colored-glass window, an indicator mounted in said chamber directly back of said transparent window, a lighting element in said chamber located to one side of said indicator and back of said colored-glass window and not visible to an observer through the transparent window and a flange extending about the periphery of the indicator and projecting towards the window far enough to shade the front face of the indicator from the direct and reflected rays of the lighting element whereby the body of the indicator as seen through the window will appear in deep shadow sharply defined against the brightly illuminated back of the said chamber and the lighting element will illuminate said colored-glass window.

8. In a turn-indicating signal for vehicles the combination of a casing having light reflecting back and side walls and having a part only of the front face thereof formed as a transparent window, an indicator mounted within said casing directly back of said window, a lamp mounted within said casing laterally of said indicator and back of the part of the casing face not having said window and not visible to an observer located opposite said window, said indicator being provided all about its edge with a flange extending towards the window so that the body of the indicator as seen through the window will be shielded from the direct and reflected light from said lamp and so that the eyes of the observer will be shielded from the direct rays of said lamp by the non-windowed part of the casing face.

9. In a turn-indicating signal for vehicles the combination of an enclosing casing having a chamber with light-reflecting back and side walls and a front face provided with a clear transparent window for most of the area and provided over a smaller lateral portion of its area with a screened portion, an indicator mounted within said chamber directly back of said clear window and having a flange about its periphery extending towards the window, a lamp mounted in said chamber back of the said screened portion of the front and having its lighting element so positioned relative to the flanged indicator as to illuminate the back and side walls of the chamber but not the face of the indicator, said lamp when turned on also illuminating said screened portion sufficiently to form a warning signal.

FRANCIS B. O'SHEA.